United States Patent
Flockhart et al.

(10) Patent No.: US 8,054,964 B2
(45) Date of Patent: Nov. 8, 2011

(54) SYSTEM AND METHOD FOR DETECTING EMOTIONS AT DIFFERENT STEPS IN A COMMUNICATION

(75) Inventors: Andrew D. Flockhart, Thornton, CO (US); Eugene P. Mathews, Marco Island, FL (US); John Z. Taylor, Bedminster, NJ (US)

(73) Assignee: Avaya Inc., Basking Ridge, NJ (US)

( * ) Notice: Subject to any disclaimer, the term of this patent is extended or adjusted under 35 U.S.C. 154(b) by 329 days.

(21) Appl. No.: 12/433,438

(22) Filed: Apr. 30, 2009

(65) Prior Publication Data

US 2010/0278318 A1    Nov. 4, 2010

(51) Int. Cl.
*H04M 3/00* (2006.01)
(52) U.S. Cl. .................. 379/265.07; 704/200.1
(58) Field of Classification Search ............. 379/265.02, 379/265.01, 265.06, 265.07; 704/200.1
See application file for complete search history.

(56) References Cited

U.S. PATENT DOCUMENTS

| | | | |
|---|---|---|---|
| 5,684,872 A | 11/1997 | Flockhart et al. | |
| 5,937,051 A * | 8/1999 | Hurd et al. | 379/212.01 |
| 6,064,731 A | 5/2000 | Flockhart et al. | |
| 6,363,346 B1 * | 3/2002 | Walters | 704/231 |
| 6,757,362 B1 | 6/2004 | Cooper et al. | |
| 6,959,080 B2 * | 10/2005 | Dezonno et al. | 379/265.07 |
| 7,013,005 B2 | 3/2006 | Yacoub et al. | |
| 7,043,008 B1 * | 5/2006 | Dewan | 379/265.06 |
| 7,120,880 B1 | 10/2006 | Dryer et al. | |
| 7,197,132 B2 | 3/2007 | Dezonno et al. | |
| 2007/0003032 A1 | 1/2007 | Batni et al. | |
| 2007/0121824 A1 * | 5/2007 | Agapi et al. | 379/88.18 |
| 2008/0151038 A1 | 6/2008 | Khouri et al. | |

OTHER PUBLICATIONS

Avaya Product Brief, Avaya Advanced Segmentation Routing and NICE Perform Provide Customer Data Controlled Routing, Sep. 2006, 2 pages.

* cited by examiner

*Primary Examiner* — Olisa Anwah

(57) ABSTRACT

The system and method establish a communication with a first party. A first emotion is detected during a first step during the communication. Steps in the communication can include: establishing a call, waiting in a queue, talking with an agent, communicating with an IVR system, and the like. A second emotion is detected at a different step in the communication. Alternatively, the first and second emotions are detected in two different but related communications. The detection of the first and/or second emotion determines how to process the communication. Examples of processing a communication can include routing the communication differently, selecting a different script for an agent, selecting a different agent, and the like. In addition, the communication can also be processed differently based on other additional parameters.

34 Claims, 3 Drawing Sheets

SYSTEM AND METHOD FOR DETECTING EMOTIONS AT DIFFERENT STEPS IN A COMMUNICATION

TECHNICAL FIELD

This invention relates to contact centers and in particular to detecting emotion at different steps in a communication in a contact center.

BACKGROUND OF THE INVENTION

Contact center systems routinely route customer contacts based on pre-existing knowledge of customer attributes such as business value, previous contacts, age, sex, location, etc. Much-less common are systems that route contacts based on more-dynamic attributes of the customer, such as the party's emotional state or state-of-mind. Yet, such systems provide a significant advantage for determining how and when to route a contact, what type of agent should handle the contact, or what should be attempted or avoided when the contact has been routed and the interaction begins. Examples of when knowing the customer's emotional state is advantageous include when deciding whether the contact-center agent should attempt to close a sale, attempt to cross-sell or upsell, or wait for another time when the customer might be in a more-receptive emotional state.

There is a considerable amount of prior art in the area of emotion-detection technology. Emotion detection uses audible, visual, and/or tactile measures to determine the emotion of a person—either the customer, the agent, or anyone else—that participates in a communication. The most common technique of emotion detection is to monitor the volume and pitch of speech of a person involved in a phone call.

Call-center prior-art that uses emotion detection includes monitoring of customer-agent interaction and using emotion detection to determine what action to take. Examples of actions include recording the interaction for later analysis, bridging a supervisor onto the call, placing an outbound conciliatory call from a supervisor to the customer, and providing different treatment to the customer the next time that the customer communicates with the contact-center. One such system is the Perform™ interactive-capture system from NICE Systems, which detects emotion during an interaction between a customer and an agent, detects problem calls by monitoring the caller's tone, pitch, and tempo, and notifies supervisors of problem calls, who may then decide to join the call or give the customer a call-back. Another such system is the Customer Data Controlled Routing from Avaya Inc., which uses emotion-detection capabilities during the flow of a call to decide whether or not to give alternative call treatment to the customer's next call. Other art of interest in this context includes the following.

U.S. Pat. No. 5,684,872 of Flockhart et al., titled "Prediction of a Caller's Motivation as a Basis for Selecting Treatment of an Incoming Call," uses historical information, such as the number of times that a customer has called in the last 24 hours, or real-time information, such as that the customer is calling from a geographical area that is experiencing a problem, to determine the motivation of a caller, and then uses the determined motivation to select the treatment that it provides to the caller. No emotion detection is used.

U.S. Pat. No. 6,064,731 of Flockhart et al., titled "Arrangement for Improving Retention of a Call Center's Customers," uses historical information, such as the number of times that a customer has abandoned from hold, the number of times that the customer has been transferred by an agent, whether the customer experienced excessively-long wait times, etc., to determine if the business relationship with this customer is at risk. This information is used to provide alternative treatment and routing to future calls of the customer. No emotion detection is used. No real-time information is used from the segmentation or queuing stages of the call to determine call treatment, routing, matching, or scripting.

U.S. Pat. No. 6,757,362 of Cooper et al., titled "Personal Virtual Assistant," is not in the area of contact center technology, but it describes a computer-based personal assistant that monitors the emotional state of a user, and then adapts its speed, verboseness, and terminology based on this information about the user. This patent also does not cover determining the emotional state of a user during call segmentation and queuing, nor does it change the way that a customer contact is routed, matched to a specific agent, or handled by an agent script.

U.S. patent application Ser. No. 11/525,452 of Coughlan, filed on Sep. 22, 2006, and titled "Method and Apparatus for Measurement of Alertness of Call Center Agents," uses auditory and visual monitoring to measure alertness of agents in a call center during customer-agent interactions. In cases where lack of alertness is detected, agents may be given unscheduled breaks. The emotional state of customers is not determined, nor is the routing or treatment of customer contacts changed based on emotional state.

U.S. Pat. No. 7,120,880 of Dryer et al., titled "Method and System for Real-Time Determination of a Subject's Interest Level to Media Content," detects what visual information a subject is attentive to via gaze detection and tracking, and detects the level of interest by measuring gaze duration and level of arousal. Arousal level is determined via head and facial gesture detection and analysis and voice content and prosody detection and analysis.

U.S. Pat. No. 7,013,005 of Yacoub et al., titled "System and Method for Prioritizing Contacts" detects a caller's emotional state and generates a priority score. The priority score is used in conjunction with other criteria to prioritize a call in a call queue.

U.S. patent application publication 2007/0003032 Batini et al., titled "Selection of Incoming Call Screening Treatment Based on Emotional State Criterion" allows a caller to enter their emotional state at an Interactive Voice Response (IVR) system. The call is then screened using the entered emotional state.

The problem with existing systems is that they only detect an emotional state of the caller in a communication at one point in the communication or that they analyze the emotional state after completion of the communication. During a communication, the emotional state of the caller can change over time. As the communication is transferred between queues, IVR Systems, and different agents, a change in the emotional state of the caller is not monitored between the various stages/steps of the communication. As a result, existing systems fail to detect the change in emotion of the caller as the communication progresses through a contact center. This sometimes results in poor decisions by the contact center in determining on how to process/route the communication in the call center.

SUMMARY OF THE INVENTION

The system and method are directed to solving these and other problems and disadvantages of the prior art. The system and method establish a communication with a first party. A first emotion is detected during a first step during the communication. Steps in the communication can include: establishing a call, waiting in a queue, talking with an agent, communicating with an IVR system, and the like. A second emotion is detected at a different step in the communication. The detection of the first and/or second emotion determines how to process the communication. Examples of processing a communication can include routing the communication differently, selecting a different script for an agent, selecting a different agent, and the like.

The system and method can also be used to detect a first and second emotion in two different, but related communications. The detection of the first and second emotion determines how to process the communication. In addition, the communication can also be processed differently based on other parameters.

BRIEF DESCRIPTION OF THE DRAWING

These and other features and advantages of the system and method will become more apparent from considering the following description of an illustrative embodiment of the invention together with the drawing, in which.

DETAILED DESCRIPTION

Figure 1:
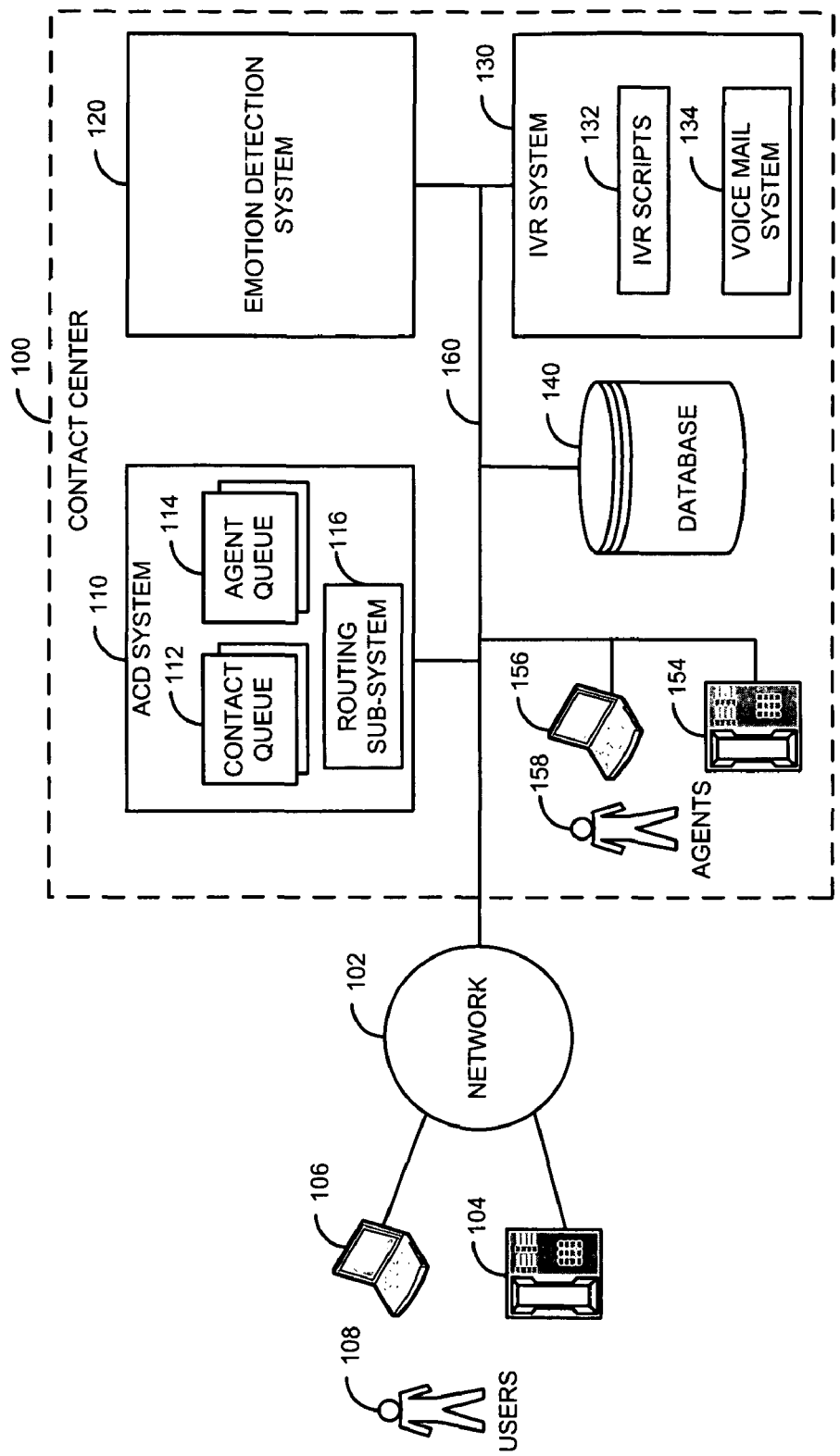
FIG. 1 is a block diagram of a first illustrative system for detecting emotion in different steps in a communication.

FIG. 1 shows a communications system that includes a contact center 100. The system interconnects communications terminals 104, 106 of users 108 with contact center 100 via a network 102. Terminals 104, 106 may be any desired terminals. For example, terminal 104 may be an analog, digital, or VoIP wired or wireless telephone. Terminal 106 may be a Personal Computer (PC) or a personal digital assistant (PDA). Or, terminals 104 and 106 may make up one device in the form of a computer that implements a soft phone, or a PDA with telephony capabilities, or a video terminal. Likewise, network 102 may be any desired network, such as the standard telephony network, a data network, the Internet, and the like. The form and nature of terminals 104, 106 and of network 102 are substantially irrelevant to this invention.

Contact center 100 comprises an Automatic Contact Distribution (ACD) system 110, an emotion detection system 120, an interactive voice response (VR) system 130, one or more databases 140, and a plurality of communication terminals 154, 156, of contact center agents 158, all interconnected by a communications medium 160. These entities may be any desired entities. For example, agent terminals 154, 156 may take the variety of forms mentioned for user terminals 104, 106. ACD system 110 may be a Private Branch Exchange (PBX), a switch, a router, a SIP proxy server, and the like. IVR system 130 may be a PBX, a server, a switch, a router, and the like. Database 140 may be any mass-storage data medium or media, and communications medium 160 maybe a switched communications network, a local area network (LAN), or a wide area network (WAN) such as the Internet. Once again, the form and nature of these entities are substantially irrelevant to this invention.

ACD system 110 implements a plurality of contact queues 112 for holding contacts awaiting their connection to agents 158, a plurality of agent queues 114 for holding identities of agents 158 awaiting assignment to contacts, and a routing subsystem 116 for routing contacts to agents 158, as is conventional. IVR system 130 implements one or more IVR scripts 132 through execution of which IVR system 130 interacts with users 108. Database 140 stores information generated by and/or for use by the various entities of contact center 100. As described so far, the system of FIG. 1 is conventional.

Emotion detection system 120 is configured to determine the emotional state of both users 108 and/or agents 158. Emotion detection system 120 can detect various types of emotion. Emotion detection using various media is well-known in the art. For example, the emotion detection system 120 may use the duration and rate of key-presses on terminals 104, 106 by users 108 and/or on terminals 154, 156 by agents 158, as illustrated, for example, in U.S. patent application Ser. No. 11/805,050. Emotion detection system 120 may use the medium of sound (words, noises, etc.) produced by users 108 and/or agents 158 and communicated by audio terminals 104, 106 and/or 154, 156, as illustrated, for example, in U.S. Pat. No. 6,275,806 or U.S. published application 2003/0182123. The emotion detection system 120 may use the medium of images, of faces and possibly of other body parts as well, of users 108 and/or agents 158 and communicated by video terminals 104, 106 and/or 154, 156, as illustrated, for example, in U.S. Pat. No. 7,120,880. These images may include thermal (infrared) images, as illustrated, for example, in U.S. published application 2006/0080357. The emotion detection system 120 could be distributed. For example, the emotion detection system 120 can be integrated into communication terminals 104, 106, 154, and 156.

According to an embodiment of the invention, the ACD system 110 is configured to establish a communication with a user 108 (party). The communication can be a voice communication, a video communication, a textual communion, or any combination of communications. The communication can be established by the users 108, the contact center 100, the ACD system, the agents 158, and the like.

The emotion detection system 120 detects a first emotion during a step of the established communication. A step can be any step in the communication as it progresses through the contact center. For example, a step could be: at the initiation/receipt of the communication, while the user 108 (party) is waiting in a contact queue 112, while an agent 158 is waiting in an agent queue 114, while the first party is communicating with an agent 158, while the first party is communicating with a supervisor of the agent 158, while the first party is speaking to a voice mail system 134, while the first party is entering information in an IVR system based on listening to IVR scripts, while the first party is speaking to an IVR system, and the like. Detecting an emotion can be done in various known ways such as: an acoustical analysis of a voice communication, an analysis of a text communication, an analysis of a voice communication converted to text, an analysis of a video communication, and the like. The emotion detection system 120 can detect emotions at any step in the communication or from any participant in the communication. For example, the first emotion could be from the user 108 or from the agent 158.

The emotion detection system 120 detects a second emotion during a second (different) step of the established communication. The ACD system 110 then affects processing of the established communication based on the first emotion and/or the second emotion. Affecting the processing of the established communication can happen in a variety of ways including, but not limited to: routing the communication with the routing sub-system 116, selecting a IVR script 132, selecting an agent script, selecting an agent 158 from the agent queue 114, and the like.

Consider the following example using the contact center 100 of FIG. 1. A user 108 establishes a voice communication with the contact center system 100 via communication terminal 104. The user 108 is placed in the contact queue 112 to wait for an available agent 158. The emotion detection system 120 monitors what the user 108 says while the user 108 waits in the contact queue 112. The emotion detection system 120 detects the first emotion from the monitored user speech from the contact queue 112. The user 108 is directed to the IVR system 130. The user 108 answers questions to a series of IVR scripts 132. The emotion detection system 120 detects the second emotion by analyzing the responses the user 108 gives to the IVR scripts 132 or by how the user 108 responds to the IVR scripts 132.

The ACD system affects the processing of the communication by routing the communication with the routing subsystem 116 to a specific agent 158 in an agent queue 114 based on the first emotion and/or the second emotion. When the agent 158 for the specific agent queue 114 becomes available, the agent 158 then communicates with the user 108. The ACD system can also provide different agent scripts (scripts that the agent 158 reads to the user 108) based on the detected first emotion and/or the second detected emotion. In addition, the ACD system can also warn the agent of the emotional state of the caller and suggest different responses such not answering the call, calling back at a later time, giving the agent a level of emotion, and the like. The emotion detection system 120 can continue to monitor the conversation between the user 108 and the agent 158 to detect additional emotions from the user 108 and/or the agent 158 to further affect the processing of the communication. For example, the agent 158 can be provided a different agent script during the communication based on additional detected emotions of the user 158.

Figure 2:
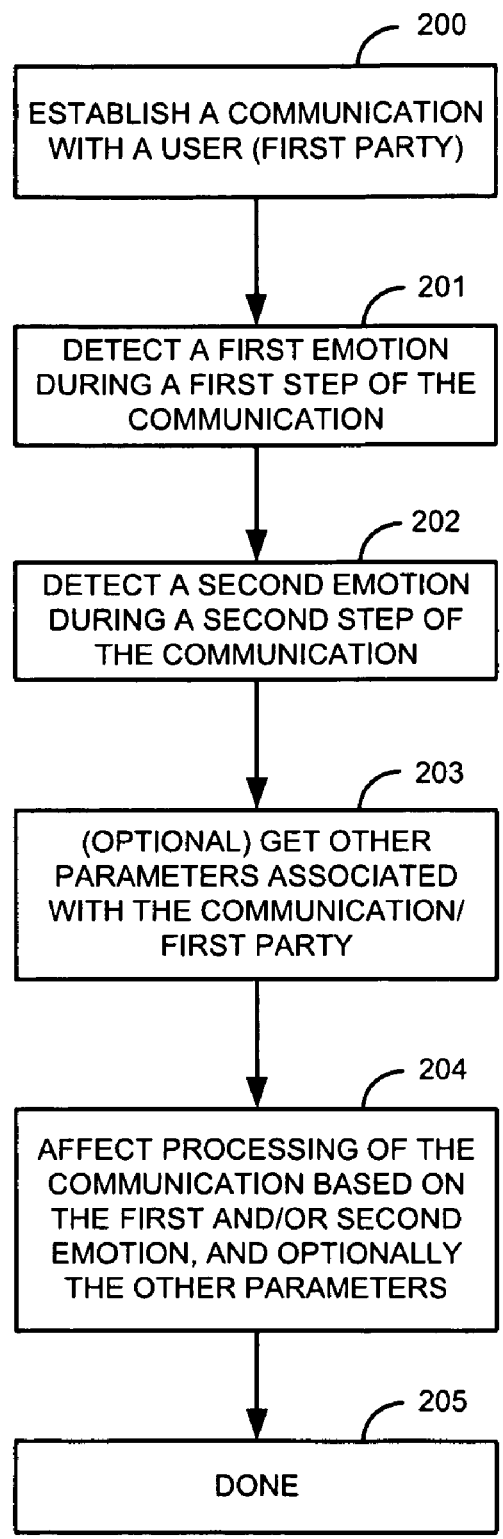
FIG. 2 is a flow diagram of a method for detecting emotion in different steps in a communication.

FIG. 2 is a flow diagram of a method for detecting emotion in different steps in a communication. Illustratively, the communication terminals (104, 106, 154, 156), the ACD system 110, the emotion detection system 120, the IVR system 130, and the database 140 are stored-program-controlled entities, such as a computer, which performs the method of FIGS. 2-3 by executing a program stored in a storage medium, such as a memory or disk.

A communication is established 200 with a user 108 (first party). A first emotion is detected 201 during a first step of the communication. An emotion can be detected at various steps in the communication. For example, the first emotion can be detected 201 when the communication is established. An emotion detection system 120 can be in a communication terminal 104, 108 and in the contact center 100. The emotion system 120 in the communication terminals 104, 108 can detect the first emotion prior to establishing the communication and send information regarding the first emotion during the establishment of the communication.

A second emotion is detected 202 during a second step of the communication. Optionally, the ACD system 110 can get 203 other parameters that can be used in conjunction with the first and second emotion. The processing of the communication is affected 204 based on the detected first emotion and/or the detected second emotion. Optionally, other parameters can be used in conjunction with the detected first emotion and the detected second emotion to affect the processing of the communication in step 204. Other parameters can include, but are not limited to: a caller ID, a service contract, a call record, a prior communication, and a capability of an agent 158. For example, the caller ID can be used in conjunction with the detected first emotion and/or the detected second emotion to route the communication and/or provide a specific agent script to be used. After affecting the processing in step 204, the process is done 205.

Figure 3:
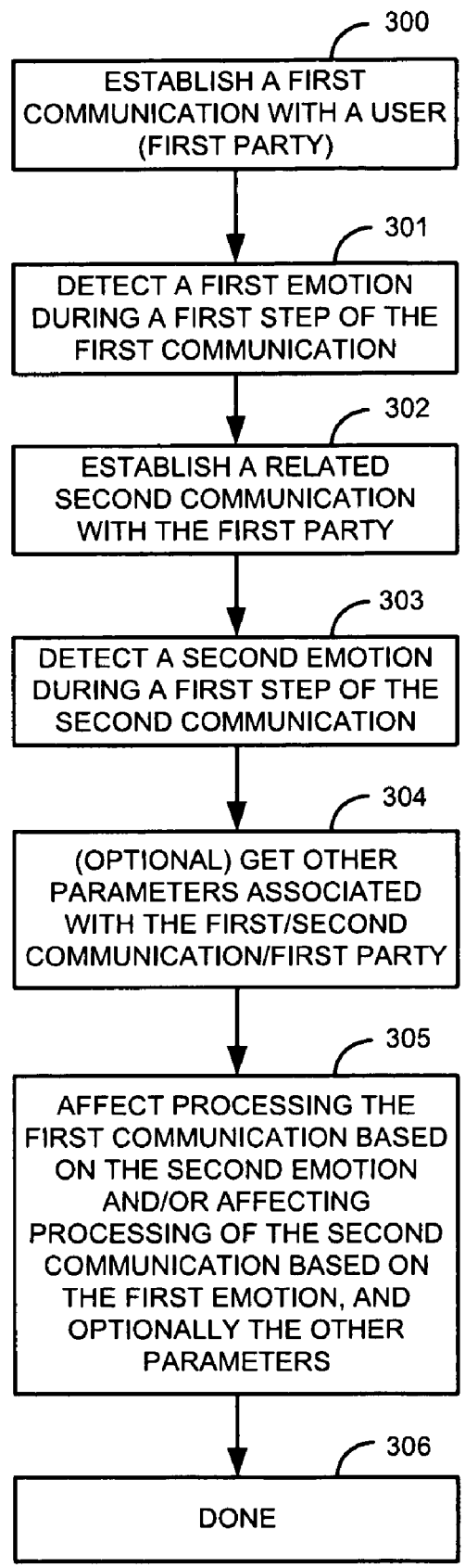
FIG. 3 is a flow diagram of a method for detecting emotions in different, but related communications.

FIG. 3 is a flow diagram of a method for detecting emotions in different, but related communications. A first communication is established 300 with a user 108 (first party). A first emotion is detected 301 during a first step of the first communication. A second communication is established 302 with the first party. The second communication is related to the first communication. The first communication and the second communication can be related in various ways. For example, the second communication may be a continuation of the first communication. The first communication can be a voice communication and the second communication can be text message in response to what was said in the first communication.

The first communication and the second communication can be established in various ways using various mediums. For example, the first communication can be a voice communication and the second communication can be an email/text. The first communication can be established by the user 108 and the second communication can be established by the agent 158. Both the first communication and the second communication can, but do not have to, be active at the same time. The relationship between the first communication and the second communication can be tracked in the database 140 using various parameters such as the caller ID, call identifiers, agent records, and the like.

A second emotion is detected 303 during a first step of the second communication. Optionally, the ACD system 110 can get 304 other parameters that can be used in conjunction with the first and second emotion. The processing of the first communication is affected 305 based on the detected second emotion and/or the processing of the second communication is affected based the detected first emotion. If there are additional communications, the processing is affected 305 based on an emotion detected in a different communication. Optionally, other parameters can be used in conjunction with the detected first emotion and/or the detected second emotion to affect the processing of the communication in step 305. After affecting the processing in step 305, the process is done 306.

Of course, various changes and modifications to the illustrative embodiment described above will be apparent to those skilled in the art. These changes and modifications can be made without departing from the spirit and the scope of the invention and without diminishing its attendant advantages. It is therefore intended that such changes and modifications be covered by the following claims except insofar as limited by the prior art.

What is claimed is:

1. A system comprising:
   a. an ACD system configured to establish a communication with a first party and affect processing of a first part of the established communication based on a detected second emotion and/or affect processing of a second part of the established communication based on a detected first emotion;
   b. an emotion detection system configured to detect the first emotion during a first step of the established communication and detect the second emotion during a second step, different from the first step of the established communication.

2. The system of claim 1, wherein the first emotion and/or the second emotion are detected at or while: the receipt of the communication, the first party is waiting in a contact queue, an agent is waiting in an agent queue, the first party is communicating with the agent, the first party is communicating with a supervisor, the first party is speaking to a voice mail system, the first party is entering information in an interactive voice response (IVR) system, and the first party is speaking to an IVR system.

3. The system of claim 1, wherein the established communication is at least one item selected from the group comprising: a voice communication, a video communication, and a text communication.

4. The system of claim 1, wherein the first emotion and/or the second emotion are detected using an analysis selected from the group comprising: an acoustical analysis of a voice communication, an analysis of a text communication, an analysis of the voice communication converted to text, and an analysis of a video communication.

5. The system of claim 1, wherein the established communication is established by the first party, by a contact center, or by an agent.

6. The system of claim 1, wherein affecting the processing is accomplished by at least one item selected from the group comprising: routing the communication, selecting an IVR script, selecting an agent script, warning an agent, and selecting the agent.

7. The system of claim 1, wherein affecting the processing further comprises affecting the processing based on at least one other parameter selected from the group comprising: a caller ID, a service contract, a call record, a prior communication, and a capability of an agent.

8. The system of claim 1, wherein the detected first emotion and the detected second emotion are emotions of the first party.

9. The system of claim 1, wherein the detected first emotion is an emotion of the first party and the detected second emotion is an emotion of an agent.

10. A system comprising:
  a. an ACD system configured to establish a first communication with a first party, establish a second communication with the first party, wherein the second communication is related to the first communication, affect processing of the first communication based on a detected second emotion, and/or affect processing of the second communication based on a detected first emotion; and
  b. an emotion detection system configured to detect the first emotion during a first step of the established first communication and detect the second emotion during a first step of the established second communication.

11. The system of claim 10, wherein the first emotion and/or the second emotion are detected at or while: the receipt of the communication, the first party is waiting in a contact queue, an agent is waiting in an agent queue, the first party is communicating with the agent, the first party is communicating with a supervisor, the first party is speaking to a voice mail system, the first party is entering information in an interactive voice response system (IVR) system, and the first party is speaking to an IVR system.

12. The system of claim 10, wherein the first communication and/or the second communication are at least one item selected from the group comprising: a voice communication, a text communication, and a video communication.

13. The system of claim 10, wherein the first emotion and/or the second emotion are detected using an analysis selected from the group comprising: an acoustical analysis of a voice communication, an analysis of a text communication, an analysis of the voice communication converted to text, and an analysis of a video communication.

14. The system of claim 10, wherein affecting the processing further comprises affecting the processing based on at least one other parameter selected from the group comprising: a caller ID, a service contract, a call record, a prior communication, and a capability of an agent.

15. The system of claim 10, wherein the detected first emotion and the detected second emotion are emotions of the first party.

16. The system of claim 10, wherein the detected first emotion is an emotion of the first party and the detected second emotion is an emotion of an agent.

17. A method comprising:
  a. establishing a communication with a first party;
  b. detecting a first emotion during a first step of the established communication;
  c. detecting a second emotion during a second step, different from the first step of the established communication; and
  d. affecting processing of a first part of the established communication based on the detected second emotion and/or affecting processing of a second part of the established communication based on the detected first emotion.

18. The method of claim 17, wherein the established communication is at least one item selected from the group comprising: a voice communication, a video communication, and a text communication.

19. The method of claim 18, wherein the first emotion and/or the second emotion are detected at or while: the receipt of the communication, the first party is waiting in a contact queue, an agent is waiting in an agent queue, the first party is communicating with the agent, the first party is communicating with a supervisor, the first party is speaking to a voice mail system, the first party is entering information in an interactive voice response system (IVR) system, and the first party is speaking to an IVR system.

20. The method of claim 17, wherein the first emotion and/or the second emotion are detected using an analysis selected from the group comprising: an acoustical analysis of a voice communication, an analysis of a text communication, an analysis of the voice communication converted to text, and an analysis of a video communication.

21. The method of claim 17, wherein the established communication is established by the first party, by a contact center, or by an agent.

22. The method of claim 17, wherein affecting the processing is accomplished by at least one item selected from the group comprising: routing the communication, selecting an IVR script, selecting an agent script, warning an agent, and selecting the agent.

23. The method of claim 17, wherein affecting the processing further comprises affecting the processing based on at least one other parameter selected from the group comprising: a caller ID, a service contract, a call record, a prior communication, and a capability of an agent.

24. The method of claim 17, wherein the detected first emotion and the detected second emotion are emotions of the first party.

25. The method of claim 17, wherein the detected first emotion is an emotion of the first party and the detected second emotion is an emotion of an agent.

26. A method comprising:
  a. establishing a first communication with a first party;
  b. detecting a first emotion during a first step of the established first communication;
  c. establishing a second communication with the first party, wherein the second communication is related to the first communication;
  d. detecting a second emotion during a first step of the established second communication;
  e. affecting processing of the first communication based on the detected second emotion; and/or f. affecting processing of the second communication based on the detected first emotion.

27. The method of claim 26, wherein the first emotion and/or the second emotion are detected at or while: the receipt of the communication, the first party is waiting in a contact queue, an agent is waiting in an agent queue, the first party is communicating with the agent, the first party is communicating with a supervisor, the first party is speaking to a voice mail system, the first party is entering information in an interactive voice response (IVR) system, and the first party is speaking to an IVR system.

28. The method of claim 26, wherein the first communication and/or the second communication are at least one item selected from the group comprising: a voice communication, a text communication, and a video communication.

29. The method of claim 26, wherein the first emotion and/or the second emotion are detected using an analysis selected from the group comprising: an acoustical analysis of a voice communication, an analysis of a text communication, an analysis of a voice communication converted to text, and an analysis of a video communication.

30. The method of claim 26, wherein affecting the processing further comprises affecting the processing based on at least one other parameter selected from the group comprising: a caller ID, a service contract, a call record, a prior communication, and a capability of an agent.

31. The method of claim 26, wherein the detected first emotion and the detected second emotion are emotions of the first party.

32. The method of claim 26, wherein the detected first emotion is an emotion of the first party and the detected second emotion is an emotion an agent.

33. An apparatus comprising:
a. means for establishing a communication with a first party;
b. means for detecting a first emotion during a first step of the established communication;
c. means for detecting a second emotion during a second step, different from the first step of the established communication;
d. means for affecting processing of a first part of the established communication based on the detected second emotion and/or affecting processing of a second part of the established communication based on the detected first emotion.

34. An apparatus comprising:
a. means for establishing a first communication with a first party;
b. means for detecting a first emotion during a first step of the established first communication;
c. means for establishing a second communication with the first party, wherein the second communication is related to the first communication;
d. means for detecting a second emotion during a first step of the established second communication;
e. means for affecting processing of the first communication based on the detected second emotion; and/or
f. means for affecting processing of the second communication based on the detected first emotion.

* * * * *